(12) United States Patent
Pekkala et al.

(10) Patent No.: US 7,390,468 B2
(45) Date of Patent: Jun. 24, 2008

(54) EXTRACTION PROCESS

(75) Inventors: Pertti Pekkala, Espoo (FI); Bror Nyman, Vanha-Ulvila (FI); Juhani Lyyra, Espoo (FI); Raimo Kuusisto, Espoo (FI); Stig-Erik Hultholm, Pori (FI); Eero Ekman, Pori (FI)

(73) Assignee: Outotec Oyj, Espoo (FI)

( * ) Notice: Subject to any disclaimer, the term of this patent is extended or adjusted under 35 U.S.C. 154(b) by 543 days.

(21) Appl. No.: 10/477,814

(22) PCT Filed: Apr. 26, 2002

(86) PCT No.: PCT/FI02/00353

§ 371 (c)(1),
(2), (4) Date: Nov. 12, 2003

(87) PCT Pub. No.: WO02/092863

PCT Pub. Date: Nov. 21, 2002

(65) Prior Publication Data

US 2004/0141896 A1 Jul. 22, 2004

(30) Foreign Application Priority Data

May 11, 2001 (FI) .................................. 20010987

(51) Int. Cl.
*B01D 11/00* (2006.01)

(52) U.S. Cl. ....................................... 423/24; 423/658.5
(58) Field of Classification Search ................... 423/23, 423/24, 658.5
See application file for complete search history.

(56) References Cited

U.S. PATENT DOCUMENTS

| 4,028,462 A | 6/1977 | Domic et al. .................. 423/24 |
| 5,207,996 A | 5/1993 | Sierakowski et al. ........... 423/27 |
| 6,599,414 B1 * | 7/2003 | Virnig et al. ................. 205/581 |

FOREIGN PATENT DOCUMENTS

| CA | 2028293 | 4/1992 |
| WO | WO 94/28184 | 12/1994 |
| WO | WO 00/69538 | 11/2000 |

* cited by examiner

*Primary Examiner*—Timothy C Vanoy
*Assistant Examiner*—James Fiorito
(74) *Attorney, Agent, or Firm*—Morgan & Finnegan, L.L.P.

(57) ABSTRACT

The invention relates to a method for the stabilization of the production capacity of an extraction plant extracting metals in a process, where the metal content of the feed solution varies. For the stabilization of capacity, the extraction cells and their piping are constructed and situated in such a way, that the extraction stages can be connected in different combinations, either in parallel or in a series. The method is especially suitable for the copper extraction process.

10 Claims, 4 Drawing Sheets

EXTRACTION PROCESS

Figure 2:
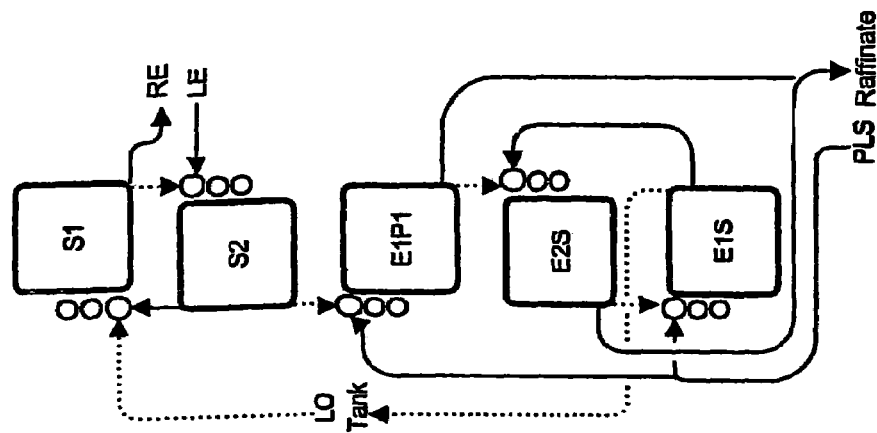

The invention relates to a method for the stabilization of the production capacity of an extraction plant extracting metals in a process, where the metal content of the feed solution varies. For the stabilization of capacity, the extraction cells and their piping are constructed and situated in such a way, that the extraction stages can be connected in different combinations, either in parallel or in a series. The method is especially suitable for a copper extraction process.

When oxidic ore is leached using heap leaching, it is common that the content of the feed solution produced from leaching varies, depending on the life span of the mine and on external conditions. As heap leaching takes place in open conditions, it is obvious that rain causes dilution of the feed solution. The recovery of copper from oxidic ore is a typical heap leaching—extraction—electrolysis process. The process description below refers to copper extraction: this, however, does not rule out the use of the method for the extraction of other metals, where the variation in the content of the feed solution also causes problems.

Traditionally, copper extraction has taken place in separate production facilities, with a certain, fixed extraction stage configuration. The extraction stages are situated in one row after another, whereupon the extraction line forms a so-called train. The extraction stage is generally composed of two or three mixers, pumps and settlers. The metal-bearing aqueous solution is conducted to the first extraction stage mixer, where it is mixed with the extraction solution coming from the following extraction stage, and is conducted to the settler. In traditional solutions the mixers are situated on the outer edge of the train. The aqueous solution and the extraction solution run in opposite directions. In traditional extraction the extraction stages are in a series with each other, as are the stripping stages. Ordinarily, there are 2-4 extraction stages and most commonly 2 stripping stages.

As previously stated, the amount of copper in the feed solution fluctuates, especially in the extraction following heap leaching, and as the extraction stages are connected in a series, where the same solution flows through all extraction stages, it means that the amount of copper produced also fluctuates. Traditional copper extraction is, however, planned and constructed for a certain amount of feed solution and a certain copper content. The amount of feed solution flow can be raised only marginally, if at all, even if the copper content of the feed solution substantially decreases, for example due to rain or to a change in leaching conditions. As a result, the capacity of copper production cannot be kept constant. An increase in the capacity of feed solution flow can only be achieved by building an additional extraction line.

In the prior art is known a configuration of extraction stages also used in copper extraction, so-called parallel-series configuration, where the extraction stages are also in one line. This configuration is used in the handling of lean feed solutions, but it is also inflexible in its extraction capacity.

Now a method has been developed for connecting the extraction stages in solution extraction of metals in such a way, that the production capacity can be kept constant. In metal extraction, where the metal content of the extraction feed solution varies, and the extraction plant comprises at least two extraction stages and two stripping stages, the extraction stages of the extraction plant are equipped with piping and valves, with the aid of which the extraction stages can be connected to each other, regarding feed solution, either in parallel or in a series. The method is especially suitable for copper extraction. The essential features of the invention are presented in the enclosed patent claims.

In the method now developed, the extraction stages of the extraction process are grouped in two adjacent lines, instead of in one train, and furthermore the stages are situated in such a way that all piping is constructed into a piping channel to be formed between the lines. In the same way, the mixers and pumps included in the stages are also situated as close to the piping channel as possible and not at the outer edge of the lines. Consequently, the piping routes are shorter than in traditional solutions. From two to six extraction stages are constructed and the extraction solution travels through both lines. According to the copper content of the feed solution, there are different alternatives for feeding the solution, either to one single stage or even to all stages. The alternative used depends on the copper content of the feed solution and the extraction capacity required. It is even more preferable to raise the extractant content in the chosen solution as described in the WO patent 00/69538 publication. In the developed method for example an extraction process containing four extraction stages is equipped with such aqueous solution lines and valves, that the extraction stages can be used in at least three different configurations, according to the copper content of the feed solution. In some cases it is preferable to connect the extraction stages simultaneously both in parallel and in series.

Figure 1:
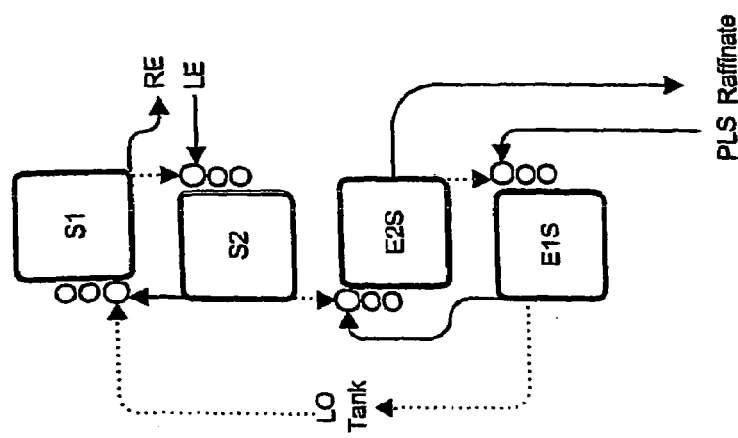
Figure 4:
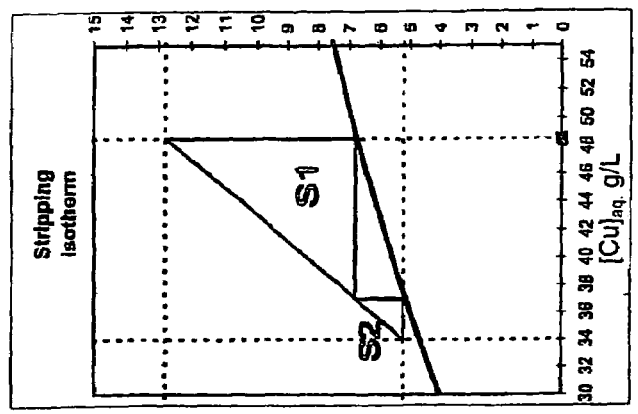
Figure 4:
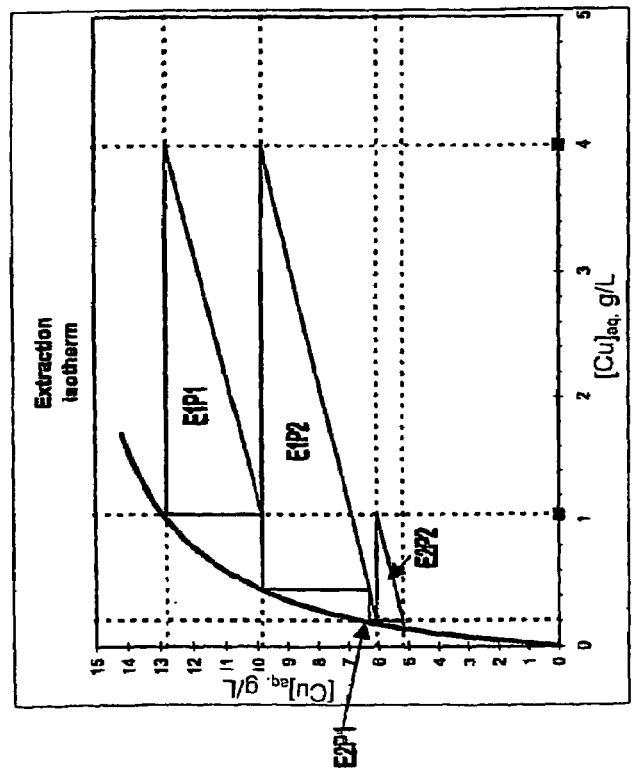
Figure 3:
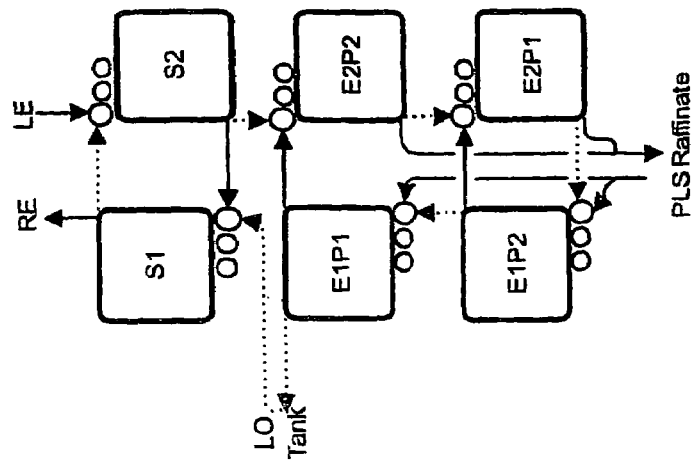
Figure 6:
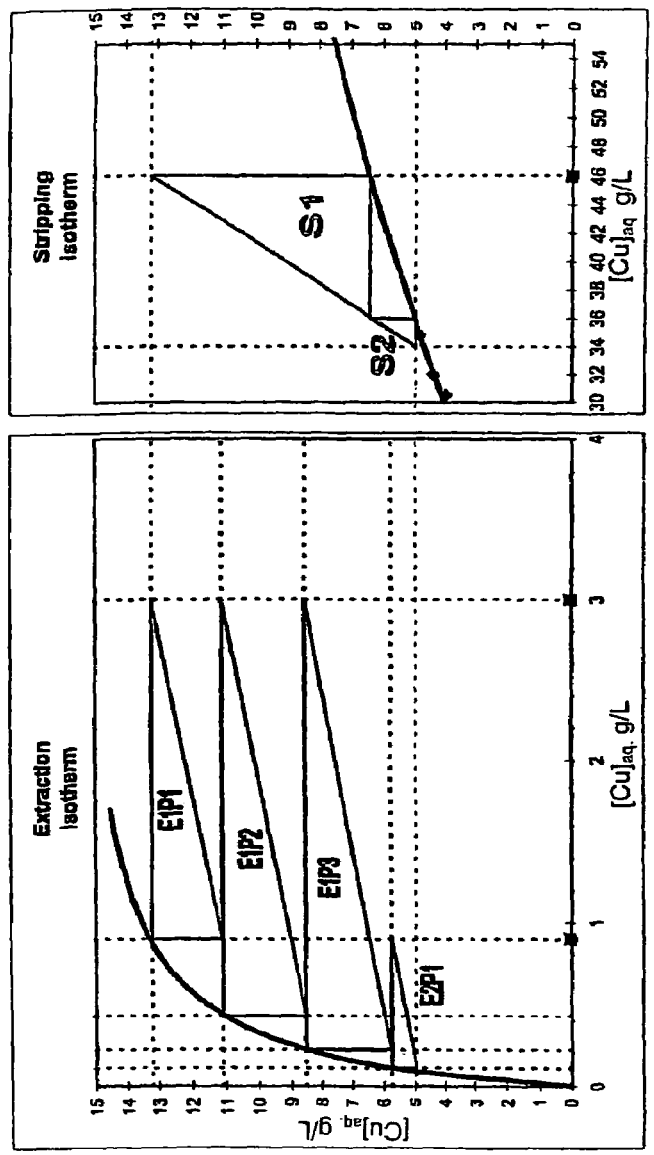
Figure 5:
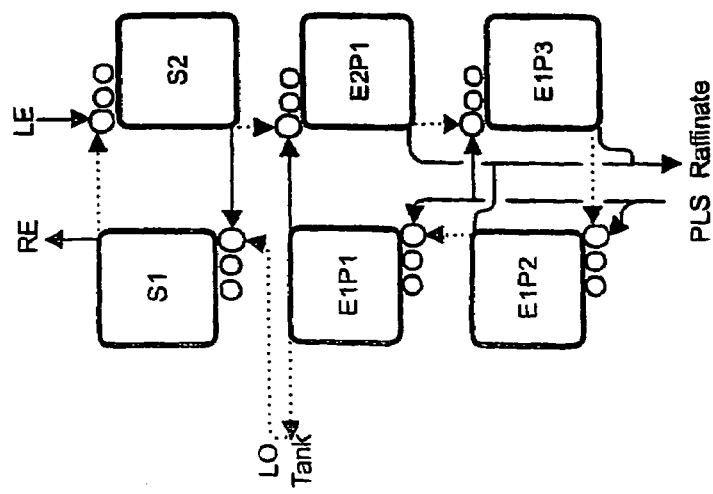
Figures 7, 8:
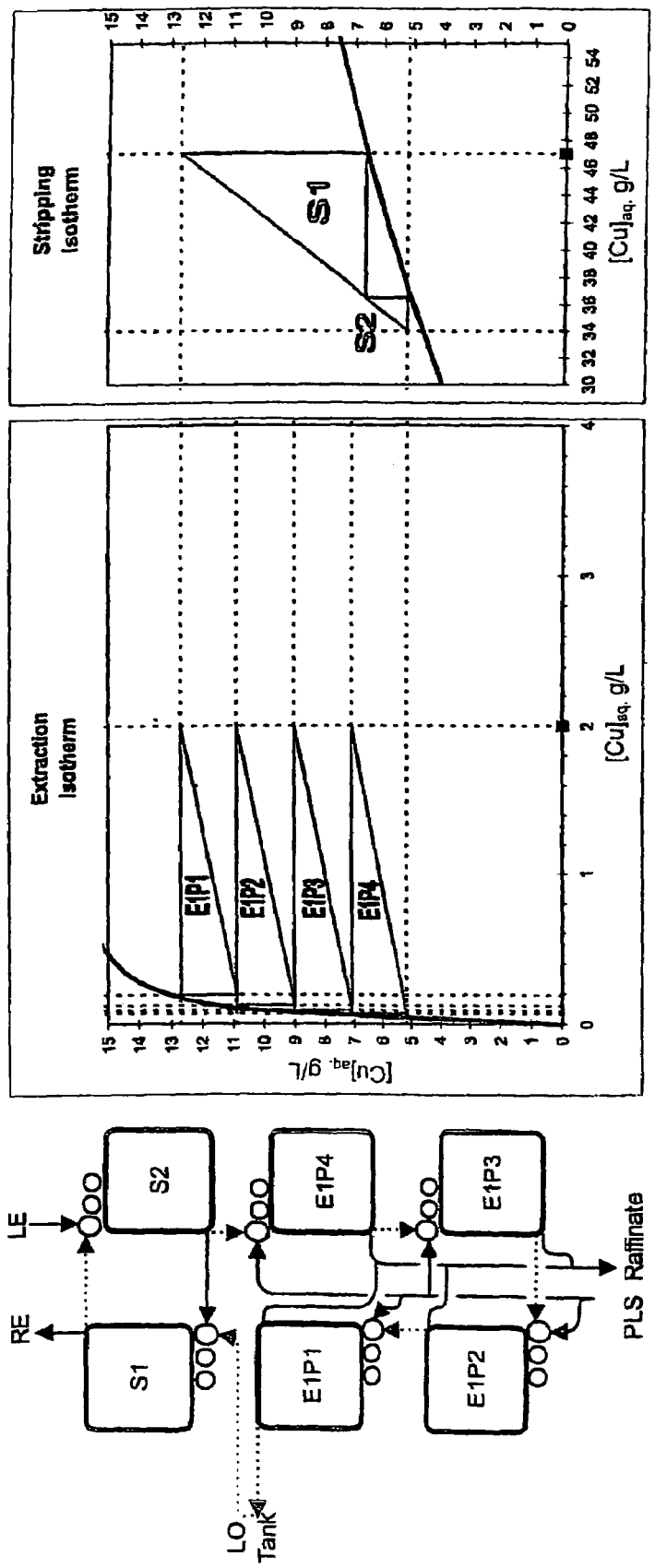

The invention is described in more detail with the aid of the enclosed figures, whereby FIG. 1 is a flowsheet of a traditional extraction stage configuration, FIG. 2 is again a flowsheet of another traditional extraction stage configuration, FIG. 3 is a flowsheet of one extraction stage configuration according to the invention, FIG. 4 shows the stage calculation of the configuration according to FIG. 3, FIG. 5 is a flowsheet of another extraction stage configuration according to the invention, FIG. 6 shows the stage calculation of the configuration according to FIG. 5, FIG. 7 is a flowsheet of a third extraction stage configuration according to the invention, FIG. 8 shows the stage calculation of the configuration according to FIG. 7.

FIG. 1 shows the flowsheet of a traditional extraction line, where there is a fixed configuration and the extraction stages are in one row. The PLS feed solution, i.e. a metal, e.g. copper bearing aqueous solution, is conducted to the first mixer of the first extraction stage E1S (extraction 1 series), according to the arrow in the figure. Here, and in the following figures, the aqueous solution is indicated as a continuous line, and the organic extraction solution as a broken line. The extraction solution flows in the reverse direction of the aqueous solution and thus it is conducted to the first mixer of the first extraction stage from the E2S settler of the following extraction stage of the extraction line. In the figures, the circles represent the mixers and pumps and the squares represent the settlers. The aqueous solution flows from the first extraction stage to the E2S extraction stage; i.e. the extraction stages are in a series. The aqueous solution (raffinate) coming from the second extraction stage is conducted back to copper leaching. The extraction solution coming from the first extraction stage, almost saturated as regards copper, is conducted to the first stripping stage, S1, along the long return line past the whole equipment series. Generally, the extraction solution is conducted to stripping via the storage tank, the LO Tank, which acts as a stabilizer for the solution cycle. The stripping aqueous solution LE (lean electrolyte) comes from electrolysis, and it is conducted to S2, the mixer of second stripping stage.

The stripping stages are also in series. The acidic copper-bearing aqueous solution RE (rich electrolyte), is removed from the first stripping stage S1, and conducted to electrolysis. The extraction solution released from copper is conducted to the second extraction stage.

FIG. 2 shows a second traditional copper extraction configuration, which is known as parallel-series configuration, used for the processing of lean feed solutions. As can be seen from the figure, the copper-bearing feed solution, PLS, is conducted to two parallel-connected extraction stages, E1S and E1P1. The aqueous solution coming from E1S, the first extraction stage, is conducted to E2S, the second extraction stage, and these two extraction stages are in a series configuration. As can also be seen from the figure, all the extraction solution coming from stripping is conducted to the latter stage configuration E1P1, being in series, and from there the extraction solution is conducted to E2S, the second extraction stage, and further to E1S, the first. As in previous setup, the extraction solution is conducted from the first extraction stage to stripping, which works in exactly the same way as shown in FIG. 1. The raffinate, the aqueous solution from which the copper has been removed, is removed both from the second and from the third extraction stages. Parallel-series configuration has thus generally one extraction stage more in the train than as in the setup according to FIG. 1. This also means that the return route of the extraction solution to stripping is still longer than in the setup of FIG. 1.

FIG. 3 shows an extraction process according to the invention, where there are 4 extraction stages, the said stages being in two adjacent lines. There is a parallel configuration of the PLS feed solution in the E1P1 and E1P2 extraction stages in the first line. Likewise, stages E2P1 and E2P2 are in parallel configuration regarding the aqueous solution (raffinate) to be removed. Both extraction stages being in parallel configuration regarding the feed solution are in series configuration to the extraction stage from where the aqueous solution is removed. The number of stripping stages is two. In the extraction stages, the extraction solution coming from stripping is firstly in contact with the aqueous solution, in which the copper content is still at its highest, since it has been extracted in stage E1P1 with extraction solution, which is almost saturated in regard to copper and thus has not, for equilibrium reasons, been able to take all the copper from it. The strongly extractable, fresh extraction solution is suitable in stage E2P2 for extracting such aqueous solution, where there is still abundant copper.

FIG. 4 illustrates a stage calculation of extraction according to FIG. 3. The extractant content is 32 vol. % in the calculation. It can be seen from the calculation that the Cu content of the feed solution is 4 g/l, of which 3 g/l are extracted in the first extraction stage, E1P1, and 1 g/l remains. In stage E2P2 the copper content of the aqueous solution is extracted to 0.2 g/l. In the second extraction pair E1P2-E2P1, extraction takes place to the same level, but in this case the copper content decreases in the first stage, E1P2, to a value of 0.5 g/l and in the second stage, E2P1, to a value of 0.2 g/l. The extraction solution circulates through the storage tank, the LO Tank, to the first stripping stage, S1, and from there to stage S2. The extraction solution returns to the first extraction stage from the second stripping stage. In stripping stages S1 and S2 the copper is extracted back to an electrolyte coming from electrolysis, which said electrolyte, being rich in copper content, is then conducted back to electrolysis. In the first stripping stage the majority of the copper in the extraction solution is extracted into the electrolyte and after the second stage the copper content of the extraction solution is of the value 5 g/l.

It can be stated that the parallel-series configuration described above is suitable for use with a feed solution having a relatively high copper content. The mixer-settler grouping is, however, located in each extraction stage so that all feed and discharge lines can be situated in the piping channel between the extraction stage lines. In this way, for example the configuration change illustrated in FIG. 5 is easy to carry out. The configuration in FIG. 5 is required e.g. in those cases where the copper content of the feed solution decreases to a level of 3 g/l. In order to maintain the extraction capacity at the previous magnitude, in this case three of the four extraction stages of the FIG. 4 are connected in parallel regarding feed solution, i.e. stages E1P1 and E1P2 of the first line and stage E1P3 of the second line. The fourth extraction stage, E2P1, is in series with stage E1P1. The extraction solution circulates in a similar manner through the circuits of both equipment lines as in the previous case; i.e. the stages are in series configuration regarding extraction solution.

FIG. 6 presents the stage calculation of FIG. 5. The extractant content of the extraction solution is 32-vol. %. The copper content of the extraction solution rises to full concentration in extraction stage E1P1, in which stage about 0.9 g/l copper still remains in the aqueous solution. As the fourth extraction stage, E2P1, is in series with stage E1P1, it can be seen that the aqueous solution can be extracted in this stage to a copper content of about 0.1 g/l. In extraction stage E1P2, the copper is extracted from the aqueous solution to a content of about 0.5 g/l, and in stage E1P3, to a content of about 0.2 g/l. The stripping stages function as described in FIG. 4.

In practice, the equipment solution according to the invention includes completed piping lines also for the setup presented in the following FIG. 7, according to which all four extraction stages are connected in parallel. It is preferable to build piping ready with valves into the piping channel for the different alternatives. In that case, the change of the extraction stage grouping from according to FIG. 5 to a grouping according to FIG. 7 requires only the opening of one valve. Correspondingly, also the outlet line of aqueous solution is ready-built and requires only the opening of one valve. It is preferable to use the extraction stage configuration according to FIG. 7 in those cases, where the copper content of the feed solution decreases to a level of e.g. 2 g/l. All extraction stages E1P1, E1P2, E1P3 and E1P4 are connected in parallel. The extraction stage grouping is still of the same form, i.e. in two equipment lines. The extraction solution circulates in the same way as described in the previous solutions, i.e. through all cells.

When an extraction solution with a content of 32-vol. % is used, we finish up with a stage calculation as per FIG. 8. According to this, copper recovery is at a level of 94%.

It is preferable to build the piping line of the extraction stage grouping according to the invention according to FIG. 7, i.e. the feed solution piping branches out from the base line to each extraction stage and likewise there is a branch to each extraction stage from the solution outlet piping. Corresponding valves are in every branch. When the valves of all the piping lines are open, all extraction stages function in parallel. In addition, there are piping and valves between the stages, arranged in a manner for a series configuration, and these are kept shut between the stages, which are desired to be in parallel. When the copper content of the feed solution rises, it is possible to change the configuration between the extraction stages into series configuration, either totally or partly, according to the description above.

The manner of connecting extraction stages according to our invention gives a flexible opportunity to keep the capacity of copper production unchanged, irrespective of the fluctuations in copper content of the feed solution. While in the calculations, the content of the feed solution to each extraction stage is kept equal to each other and also equal to extraction solution flow, this is not essential. External pumping ratios can also vary to a great degree, for example the ratio between the organic and aqueous solution can range between 0.5-5.0. Thus when in operation, the extraction performance characteristics can be adjusted exactly as desired.

When the copper content of the feed solution decreases to a value below 2 g/l and even further to 1 g/l, the number of extraction stages required can be added to the extraction stage lines described above. For example a copper content of 1.4 g/l necessitates one additional extraction stage for each equipment line, i.e. six extraction stages in all. The same volume of feed solution as before is conducted to each extraction stage and, by means of the setup, it is possible to maintain the same level of copper production as before. The extraction solution flow is kept constant. In the configuration, either all stages are in parallel configuration or four-five in parallel and, correspondingly, one-two in series.

By the method according to the invention it is possible not only to maintain the same production level even if the copper content of the feed solution decreases; it is also possible to utilize the method when the copper content in the feed solution increases. The piping lines can thus be constructed also with a view to an alternative where not all extraction stages are used, when the copper content of the feed solution is sufficiently high. Then for example only two extraction stages, which are connected in series, need be used. The desired stage configuration can be achieved by opening the desired valves and by shutting all those connected to the parallel configuration, and in the same way by completely disconnecting the flow to part of the stages.

The purpose of the method according to the invention is to move away from the traditional extraction stage line (SX train) and to adopt a new, flexible extraction stage grouping, where the stages are situated in two lines, with piping channel located between. The extraction stages are situated in such a way that their piping is placed in piping channel and the stages are equipped with piping valves, which enable the flexible use of the stages, both in parallel and in series configuration, according to the content of the feed solution. The extraction solution still circulates through all stages. With the aid of the method, it is possible to keep copper recovery from the extraction plant nearly the same, irrespective of the configuration of the extraction stages.

The invention claimed is:

1. A method for stabilizing the production capacity of an extraction plant of a metal solution extraction in a process, where the metal content of the extraction feed solution fluctuates, said extraction plant comprising at least two extraction stages and two stripping stages, wherein the extraction stages of the extraction plant, in relation to the feed solution, are connectable with each other either in parallel or/and in series depending on the metal content of the feed solution, and the extraction stages are equipped with piping and valves that connect the stages with each other both in parallel and in series, the extraction stages being located in two lines with a piping channel between the lines.

2. A method according to patent claim 1 wherein the extraction stages are connected with each other partly in series and partly in parallel.

3. A method according to patent claim 1 wherein the extraction stages are all connected in parallel.

4. A method according to patent claim 1 wherein the extraction stages are simultaneously connected both in parallel and in series.

5. A method according to patent claim 1 wherein the extraction solution circulates in a series through all extraction stages.

6. A method according to patent claim 1 wherein the metal to be extracted is copper.

7. A method according to patent claim 1 wherein the metal content of the feed solution being high, a part of the extraction stages can be disconnected.

8. A method according to patent claim 1 wherein the metal content of the feed solution being low, all extraction stages are connected in parallel to each other.

9. A method according to patent claim 1 wherein an exterior pumping ratio of the organic extraction solution and feed solution varies between 0.5-5.0.

10. A method according to patent claim 1 wherein the metal recovery of the extraction plant is kept essentially constant, irrespective of the configuration of the extraction stages.

* * * * *